United States Patent
Zeng et al.

(10) Patent No.: US 9,939,970 B2
(45) Date of Patent: Apr. 10, 2018

(54) TOUCH SUBSTRATE AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui Province (CN)

(72) Inventors: Ting Zeng, Beijing (CN); Ming Hu, Beijing (CN); Hongqiang Luo, Beijing (CN); Kefeng Li, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 16 days.

(21) Appl. No.: 14/744,282

(22) Filed: Jun. 19, 2015

(65) Prior Publication Data
US 2016/0103519 A1    Apr. 14, 2016

(30) Foreign Application Priority Data
Oct. 10, 2014    (CN) .......................... 2014 1 0531442

(51) Int. Cl.
*G06F 3/045* (2006.01)
*G06F 3/044* (2006.01)

(52) U.S. Cl.
CPC .... *G06F 3/044* (2013.01); *G06F 2203/04103* (2013.01); *G06F 2203/04112* (2013.01)

(58) Field of Classification Search
CPC .. G06F 2203/04111; G06F 2203/04112; G06F 3/045; G06F 3/044
See application file for complete search history.

(56) References Cited

U.S. PATENT DOCUMENTS

| | | | |
|---|---|---|---|
| 2010/0065817 A1* | 3/2010 | Lee ........................ | B82Y 10/00 257/14 |
| 2011/0273396 A1* | 11/2011 | Chung .................... | G06F 3/041 345/174 |
| 2013/0021289 A1* | 1/2013 | Chen ..................... | G06F 1/1601 345/174 |
| 2013/0082234 A1* | 4/2013 | Bao ....................... | H01L 51/424 257/9 |

* cited by examiner

Primary Examiner — Temesghen Ghebretinsae
Assistant Examiner — Paras D Karki
(74) *Attorney, Agent, or Firm* — Ladas & Parry LLP

(57) ABSTRACT

A touch substrate and a display device are disclosed. The touch substrate includes a plurality of first electrodes and second electrodes disposed as intersecting each other, wherein the first electrodes and the second electrodes contact each other at intersecting positions and form heterojunction therein. The touch substrate of the invention takes advantage of unidirectional conductive feature of the heterojunction to prevent the interference between the first electrodes and the second electrodes, thereby guaranteeing the good performance of the touch substrate.

9 Claims, 4 Drawing Sheets

TOUCH SUBSTRATE AND DISPLAY DEVICE

FIELD OF THE ART

Embodiments of the invention relate to a touch substrate and a display device.

BACKGROUND

Displays with touch function (i.e., touch displays) are more and more widely used. As an important form of touch displays, capacitive touch displays is provided with a plurality of drive electrodes (Tx) and sense electrodes (Rx) being disposed as intersecting each other, and capacitors are formed at adjacent positions of the two kinds of electrodes. Each of the drive electrodes apply drive signals by scanning, thus a sense signal is generated on a corresponding sense electrode. When a touch happens, a human body or a touch pen gets close to the touch area, affecting capacitors between the two kinds of electrodes in the touch area, causing change in the sense signal of the corresponding sense electrode, thereby deciding the touch position.

To prevent the electrodes from affecting the display, conventional drive electrodes and sense electrodes are made of transparent conductive materials such as tin indium oxide (ITO). However, the touch effect is compromised due to high resistance of ITO. Due to the above fact, metal mesh technology is developed, which fabricates the drive electrodes and/or sense electrodes with low resistance metal materials (such as silver, aluminum, copper, molybdenum, niobium or alloys thereof). As these metals are not transparent, they are made into a mesh.

A metal mesh touch substrate is illustrated in FIGS. 1 to 3, which may be an outmost protective plate of a display panel, with a touch structure thereof disposed at a side (facing the display panel) of a substrate 9. Black matrix is disposed around the perimeter of substrate 9 and configured for blocking leads of the touch structure (not illustrated in the drawing). The leads are disposed at a side of the black matrix further away from the substrate 9 (thus the leads are blocked by the black matrix when viewed from the side closer to the substrate 9) and configured for connecting drive electrodes 1 and sense electrodes 2 to a sense chip. A plurality of drive electrodes 1 disposed along the row direction (horizontally) and sense electrodes 2 disposed along the column direction (vertically) are disposed at the middle part of the substrate 9. Herein, each of the drive electrodes 1 comprises a plurality of rhombic drive metal meshes 11 disposed in one row, and adjacent drive metal meshes 11 are connected directly through the connection portion 12; each of the sense electrodes 2 comprises a plurality of rhombic sense metal meshes 21 disposed in one column, the sense metal meshes 21 are disposed on a same layer as the drive metal meshes 11, and adjacent sense metal meshes 21 are connected through the connection bridge 22. Herein the connection bridge 22 may be made of tin indium oxide (i.e., ITO bridge). Herein, the drive metal meshes 11, the sense metal meshes 21 and the connection portion 12 are all disposed on the substrate and formed simultaneously, with an insulation layer 4 overlaying thereon. The connection bridges 22 are disposed on the insulation layer 4 and connected to the sense metal meshes 21 through via holes in the insulation layer 4, thereby preventing the conduction between the drive electrodes 1 and the sense electrodes 2 at the overlaying positions. The connection bridges 22 are actually disposed above the insulation layer 4 and on a different layer from the metal meshes and the connection portion 12. However, as the insulation layer 4 is transparent, the connection bridges 22, metal meshes and connection portions 12 are visible simultaneously in the top view.

In the above example, both the drive metal meshes 11 and the sense metal meshes 21 are rhombic, and they may be of other shapes such as strip and the like, as long as they can respectively form the drive electrodes 1 and the sense electrodes 2 which intersect each other, and capacitors can be formed at adjacent positions of the metal meshes of two different electrodes. Such alternative shapes will not be elaborated herein.

It is seen from the above that the touch structure of metal mesh touch substrate is disposed on a single substrate, which belongs to an OGS (One glass solution) mode and is beneficial to reduce the thickness of the touch display. Meanwhile, the electrodes of the touch structure are disposed in the same layer, thus only four fabrication processes are needed when fabricating the touch structure: forming the black matrix, forming the metal layer (including the drive metal meshes 11, the sense metal meshes 21 and the connection portion 12), forming the insulation layer 4 having via holes, and forming the connection bridge 22.

The inventor finds that the conventional technology has the following problems: the adjacent sense metal meshes 21 are connected to each other through the connection bridges 22, which will inevitably generate a stacked structure at the position of bridge connection, easily causing problems such as bad anti-ESD performance and visibility of the bridge connection spots. Moreover, the fabricating process of the touch substrate is relatively complicated.

SUMMARY

A first aspect of the invention provide a touch substrate, comprising: a plurality of first electrodes and second electrodes disposed as intersecting each other, wherein the first electrode and the second electrode contact each other at intersecting position and form heterojunction therein.

As an example, each of the first electrodes comprises a plurality of first sub-electrodes and first connection portions configured for connecting two adjacent first sub-electrodes; each of the second electrode comprises a plurality of second sub-electrodes and second connection portions configured for connecting two adjacent second sub-electrodes; the first connection portion of the first electrode intersects with and contacts the second connection portion of the second electrode.

As an example, the first electrode is made of a metal material and the second electrode is made of a semiconductor material.

As an example, the semiconductor material is graphene.

As an example, the first sub-electrodes have a structure of metal mesh.

As an example, the first electrode is made of an n-doped semiconductor material and the second electrode is made of a p-doped semiconductor material.

As an example, the n-doped semiconductor material is nitrogen-doped graphene and the p-doped semiconductor material is phosphorus-doped graphene.

As an example, the first electrode is a drive electrode and the second electrode is a sense electrode.

As an example, the first electrode is a sense electrode and the second electrode is a drive electrode.

A second aspect of the invention provides a display device comprising the above touch substrate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

An embodiment of the invention provides a touch substrate, which comprises a substrate, and a plurality of first electrodes and a plurality of second electrodes disposed on the substrate and as intersecting each other. In the embodiment of the invention, the first electrode and the second electrode contact each other at intersecting positions and form heterojunction.

Those skilled in the art would understand that the heterojunction may be an area formed by contact of two kinds of semiconductor materials, i.e., a p-n junction, or may be an area formed by contact of a conductor and a semiconductor, i.e., a Schottky junction. The heterojunction has a unidirectional conduction property, that is, the two kinds of materials forming the heterojunction will not conduct each other even if they contact. In the embodiments of the invention, the heterojunctions are formed at intersecting positions where the first electrode contacts the second electrode by taking advantage of the unidirectional conduction property of the heterojunction, and a space charge region (the space charge region is a virtual region) is formed in accordance with heterojunction theory, thereby preventing the current transmission along the vertical direction at intersecting positions where the first electrode contacts the second electrode. As a result, the signals respectively transmitted in the first electrodes and the second electrodes will not interfere each other, which further eliminates the insulation layer needed to separate the layer having the first electrode from the layer having the second electrode, thus simplifying the fabrication process. In the meantime, the stacked structure at the position of bridge connection on the touch substrate in conventional technology no longer exists, solving the visibility of the bridge connection spot, and enhancing the anti-ESD performance.

Embodiment 1

The embodiment of the invention provides a touch substrate, which comprises a substrate 9, a plurality of first electrodes and a plurality of second electrodes disposed on the substrate 9 and as intersecting each other.

Figure 1:
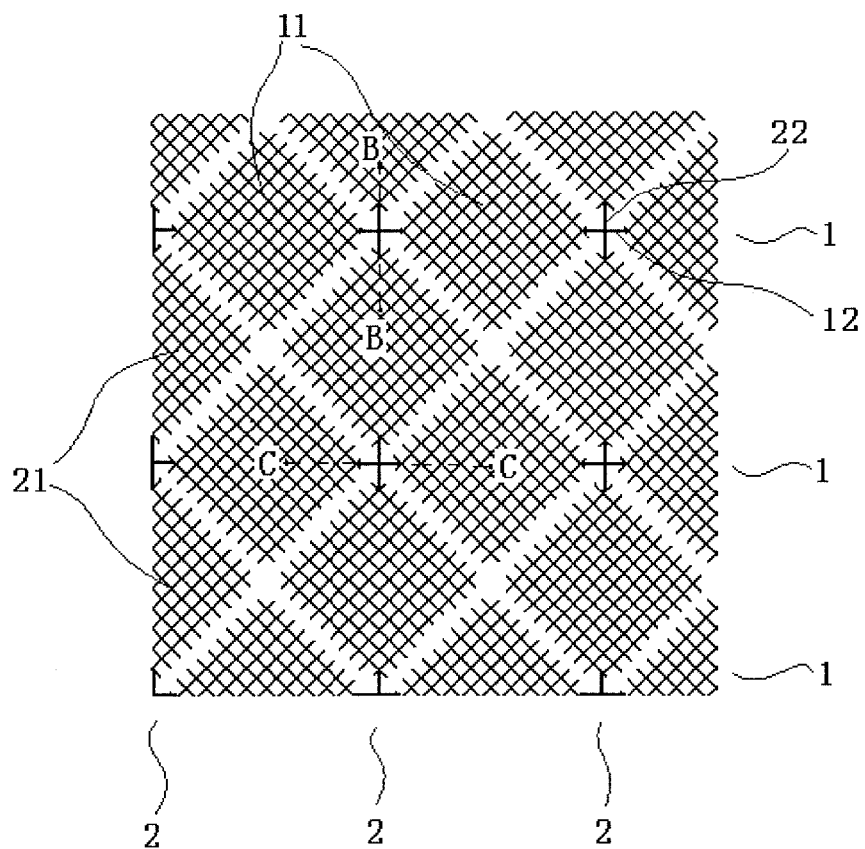
FIG. 1 schematically illustrates a partial top view of a conventional touch substrate (the insulation layer is transparent)
Figure 2:
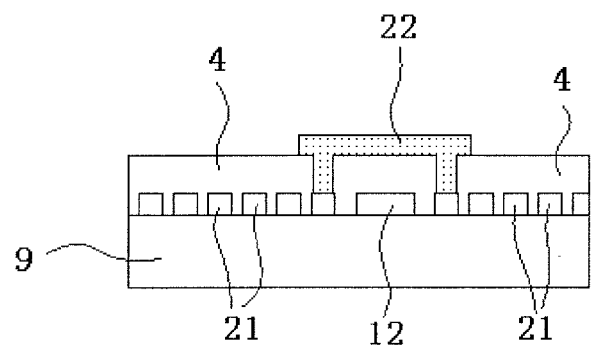
FIG. 2 schematically illustrates a cross section of the touch substrate of FIG. 1 taken along B-B line.
Figure 3:
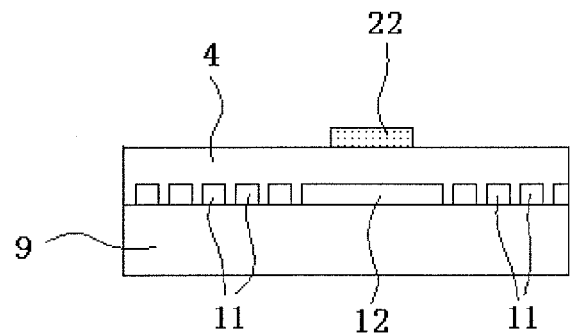
FIG. 3 schematically illustrates a cross section of the touch substrate of FIG. 1 taken along C-C line.
Figure 4:
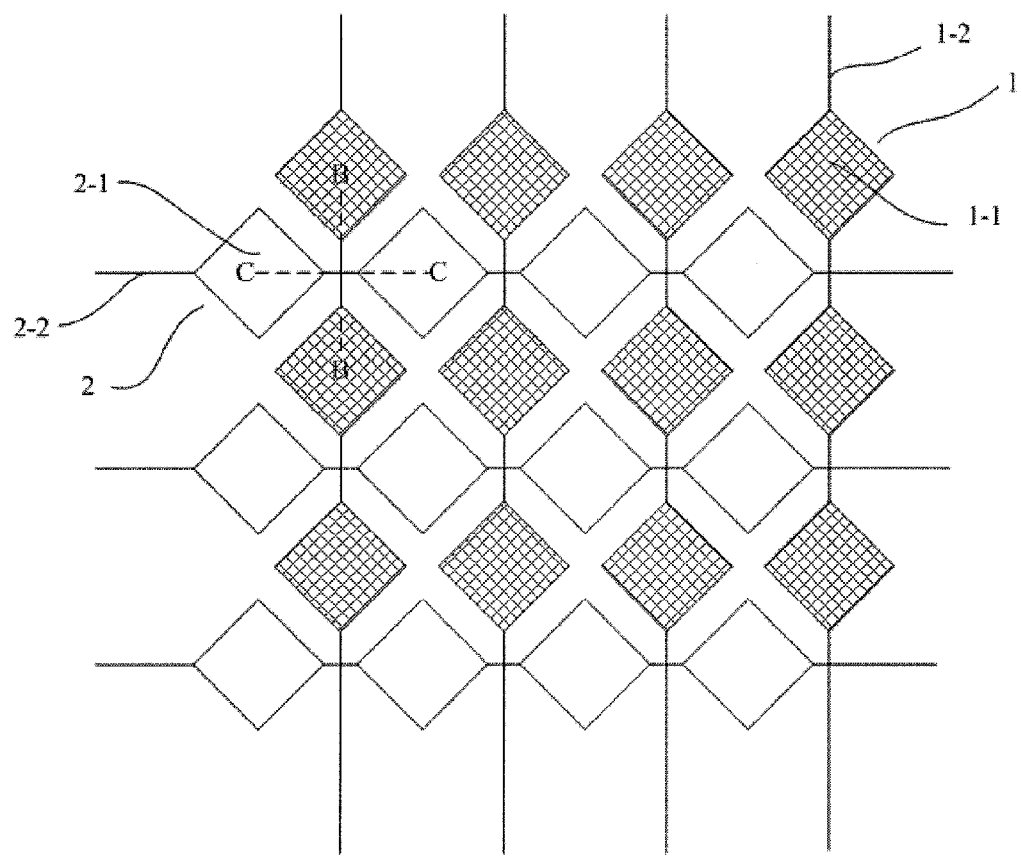
FIG. 4 schematically illustrates a partial top view of a touch substrate in accordance with Embodiment 1 of the invention.
Figure 5:
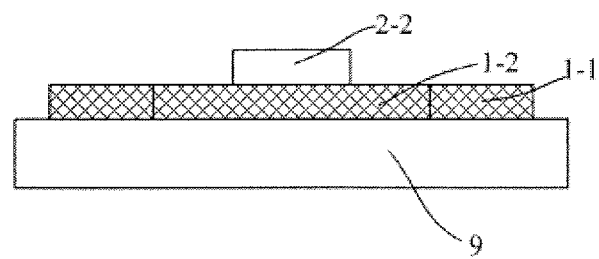
FIG. 5 schematically illustrates a cross section of the touch substrate of FIG. 4 taken along B-B line.
Figure 6:
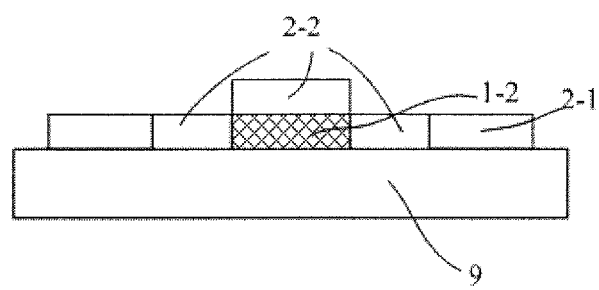
FIG. 6 schematically illustrates a cross section of the touch substrate of FIG. 4 taken along C-C line.

As illustrated in FIGS. 4 to 6, in the embodiment of the invention, a drive electrode 1 is the first electrode, a sense electrode 2 is the second electrode; the first electrode is made of a metal material and the second electrode is made of a semiconductor material such as graphene.

The above configuration is due to the following consideration: when the second electrode is made of the semiconductor material graphene and the first electrode is made of a metal material, the resistance of the first electrode is relatively smaller than that of the second electrode. As the drive electrodes 1 generally need lower resistance to enhance its loading ability to load a relatively larger signal, the first electrode is more suitable as the drive electrode 1. It can be understood that, it is also possible to use the sense electrode 2 as the first electrode and the drive electrode 1 as the second electrode, as long as the connection relation between the electrodes and the touch chip is changed, which will not be elaborated herein.

In the embodiment of the invention, the drive electrode 1 is the first electrode, and the sense electrode 2 is the second electrode. Accordingly, the drive sub-electrode 1-1 is the first sub-electrode, and the sense sub-electrode 2-1 is the second sub-electrode.

Each of the drive electrodes 1 comprises a plurality of drive sub-electrodes 1-1, and the neighboring drive sub-electrodes 1-1 are connected to each other through the first connection portion 1-2. Each of the sense electrodes 2 comprises a plurality of sense sub-electrodes 2-1, and the neighboring sense sub-electrodes 2-1 are connected to each other through the second connection portion 2-2. Moreover, the first connection portion 1-2 of the drive electrodes 1 intersects with and contacts the second connection portion 2-2 of the sense electrodes 2. Furthermore, a structure of the drive sub-electrodes 1-1 is for example a metal mesh, thereby reducing the resistance of the drive electrodes 1, and increasing the aperture ratio.

The touch substrate typically comprises a plurality of "sub-electrodes" disposed spaced from each other, and the structure of the sub-electrodes may be rhombus, thus filling up the touch substrate. Furthermore, the plurality of drive sub-electrodes 1-1 disposed in one row is connected to each other through the first connection portions 1-2, thus forming one of drive electrodes 1; and the plurality of sense sub-electrodes 2-1 disposed in one column is connected to each other through the second connection portions 2-2, thus forming one of sense electrodes 2. It is seen that capacitors may be formed at adjacent marginal regions of the sense sub-electrodes 2-1 and the drive sub-electrodes 1-1, thereby functioning for touching.

As the first connection portion 1-2 of the drive electrodes 1 intersects with and contacts the second connection portion 2-2 of the sense electrodes 2, the sense electrodes 2 may be fabricated above the drive electrodes 1 directly. In this sense, the fabricating of the insulation layer disposed between the first connection portions 1-2 and the second connection portions 2-2 in conventional technology is omitted, thereby simplifying the fabricating process while making the touch substrate thinner.

That is, the heterojunctions are formed at positions where the first connection portion 1-2 intersects with and contacts the second connection portion 2-2. As the material of the first connection portions 1-2 is metal and the material of the second connection portions 2-2 is graphene which is a semiconductor material, the heterojunctions are Schottky junctions. As a result, both the first connection portions 1-2 and the second connection portions 2-2 are unidirectionally conductive. It can be understood that, the drive electrodes 1 and the sense electrodes 2 are unidirectionally conductive, therefore the signals transmitted in the drive electrodes 1 and the sense electrodes 2 will not interfere each other, and the anti-ESD ability is increased.

It can be understood that, as long as the heterojunctions are formed at positions where the first electrode intersects with and contacts the second electrodes, the first and second electrodes will not conduct with each other, thus the signals transmitted in the first electrodes and second the electrodes will not interfere each other. As a result, in the embodiment of the invention, the first sub-electrodes, the first connection portions 1-2 and the second sub-electrodes are made of metal materials, and the second connection portions 2-2 are made of semiconductor materials. Alternatively, it is also possible that the second sub-electrodes, the second connection portions 2-2 and the first sub-electrodes are made of metal materials, and the first connection portions 1-2 are made of semiconductor materials.

Embodiment 2

Figure 7:
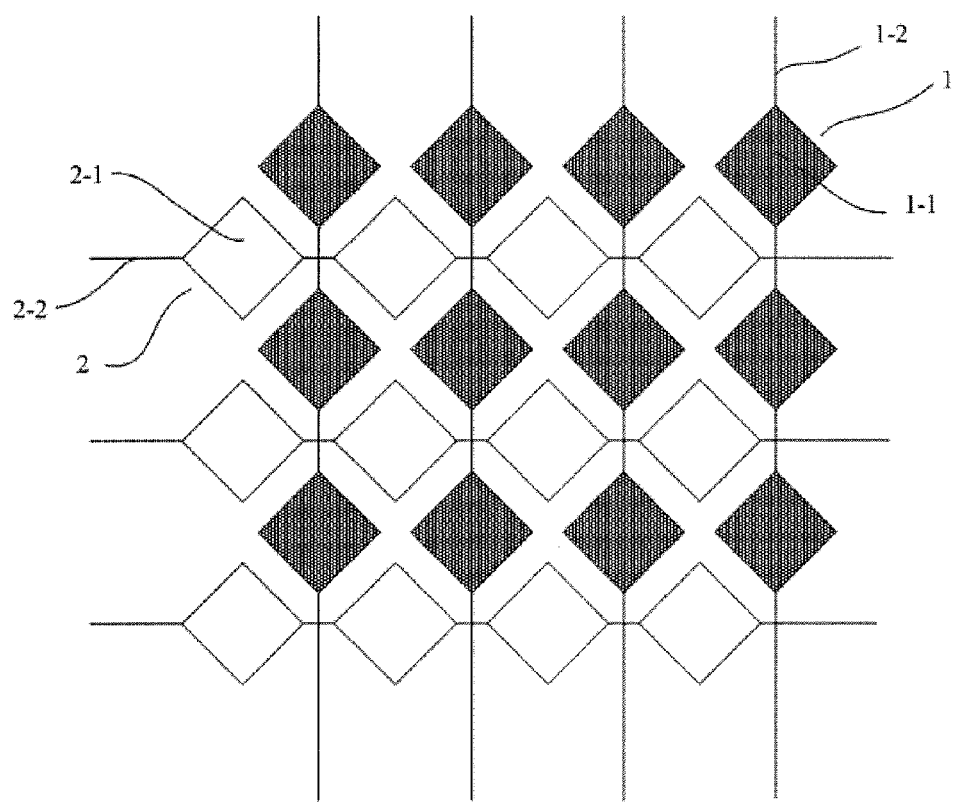
FIG. 7 schematically illustrates a partial top view of a touch substrate in accordance with Embodiment 2 of the invention.

As illustrated in FIG. 7, the embodiment of the invention provides a touch substrate, which differs from the touch substrate of the embodiment 1 in that the drive electrodes 1 are made of an n-doped semiconductor material and the sense electrodes 2 are made of a p-doped semiconductor material. As an example, the drive electrodes 1 are made of nitrogen-doped graphene, and the sense electrodes 2 are made of phosphorus-doped graphene.

It is similar to the above-mentioned touch substrate in that each of the drive electrodes 1 in the present touch substrate preferably comprises a plurality of drive sub-electrodes 1-1, the neighboring drive sub-electrodes 1-1 are connected to each other through first connection portion 1-2; each of the sense electrodes 2 comprises a plurality of sense sub-electrodes 2-1; the neighboring sense sub-electrodes 2-1 are connected to each other through second connection portion 2-2; and the first connection portion 1-2 of the drive electrodes 1 intersects with and contacts the second connection portion 2-2 of the sense electrodes 2.

In this case, considering that the drive electrodes 1 are made of an n-doped semiconductor material and the sense electrodes 2 are made of a p-doped semiconductor material, the heterojunction formed at positions where the first connection portion 1-2 intersects with and contacts the second connection portions 2-2 is p-n junction, thereby the first connection portion 1-2 and the second connection portion 2-2 are both unidirectionally conductive. It can be understood that since the drive electrodes 1 and the sense electrodes 2 are unidirectionally conductive, the signals transmitted in the drive electrodes 1 and the sense electrodes 2 will not interfere each other, and the anti-ESD ability is enhanced.

It can be understood that, as long as the heterojunctions are formed at positions where the first electrode intersects with and contacts the second electrode, the first electrode and the second electrode will not conduct to each other, thus the signals transmitted in the first electrodes and the second electrodes will not interfere each other. That is, in the embodiment of the invention, one of the first connection portions 1-2 and second connection portions 2-2 intersecting each other is made of an n-doped semiconductor material and the other is made of a p-doped semiconductor material. Therefore, the first sub-electrodes and the second sub-electrodes may also be made of metal materials. The difference is that the fabricating process is a bit more complicated.

The above embodiments may have various modifications. As an example, each of the sub-electrodes has a shape of a strip and the like. Meanwhile, it is noted that the semiconductor materials used in the embodiments, being they n-doped or p-doped, are all heavily doped materials, thus guaranteeing good conductivity of the semiconductor materials. Those skilled in the art would understand that the conductivity of heavily doped semiconductor material is equal to that of conductors'.

Embodiment 3

The embodiment of the invention provides a display device, which comprises any of the above touch substrate. The display device may be a LCD display panel, an E-paper, an OLED panel, a mobile phone, a tablet PC, a television, a display, a laptop computers, a digital photo frame, a navigator or any products or components with a display function.

What is described above is related to the illustrative embodiments of the disclosure only and not limitative to the scope of the disclosure; the scopes of the disclosure are defined by the accompanying claims.

This application claims the priority of Chinese Patent Application No. 201410531442.9, filed on Oct. 10, 2014, and which application is incorporated herein by reference.

What is claimed is:

1. A touch substrate, comprising: a plurality of first electrodes and second electrodes disposed as intersecting each other to form the touch substrate, wherein the first electrodes and the second electrodes contact each other and form heterojunctions at each intersecting position,
   wherein each heterojunction is of two-layer structure consisting of at least one of the first electrodes contacting at least one of the second electrodes; and wherein each of the first electrodes is graphene made of an n-doped semiconductor material and each of the second electrodes is graphene made of a p-doped semiconductor material, wherein each of the first electrodes comprises a plurality of first sub-electrodes and first connection portions configured for connecting two adjacent first sub-electrodes; each of the second electrodes comprises a plurality of second sub-electrodes and second connection portions configured for connecting two adjacent second sub-electrodes; the first connection portion of each of the first electrodes intersects with and contacts the second connection portion of each of the second electrodes.

2. The touch substrate of claim 1, wherein the n-doped semiconductor material is nitrogen-doped graphene and the p-doped semiconductor material is phosphorus-doped graphene.

3. The touch substrate of claim 1, wherein each of the first electrodes is a drive electrode and each of the second electrodes is a sense electrode.

4. The touch substrate of claim 1, wherein each of the first electrodes is a sense electrode and each of the second electrodes is a drive electrode.

5. A display device, comprising the touch substrate of claim 1.

6. The display device of claim 5, wherein each of the first electrodes comprises a plurality of first sub-electrodes and first connection portions configured for connecting two adjacent first sub-electrodes; each of the second electrodes comprises a plurality of second sub-electrodes and second connection portions configured for connecting two adjacent second sub-electrodes; the first connection portion of each of the first electrodes intersects with and contacts the second connection portion of each of the second electrodes.

7. The display device of claim 5, wherein the n-doped semiconductor material is nitrogen-doped graphene and the p-doped semiconductor material is phosphorus-doped graphene.

8. The display device of claim 5, wherein each of the first electrodes is a drive electrode and the each of the second electrodes is a sense electrode.

9. The display device of claim 5, wherein each of the first electrodes is a sense electrode and each of the second electrodes is a drive electrode.

* * * * *